United States Patent [19]

Breslau

[11] 4,381,144
[45] Apr. 26, 1983

[54] UNDERWATER CAMERA ENCLOSURE INCLUDING SONAR RANGE FINDING DEVICE

[76] Inventor: Lloyd Breslau, 23 Bobwhite Trail, Gales Ferry, Conn. 06335

[21] Appl. No.: 283,557

[22] Filed: Jul. 15, 1981

[51] Int. Cl.³ .................. G03B 17/08; G01S 15/08
[52] U.S. Cl. ........................ 354/64; 354/83; 354/129; 354/195; 367/2; 367/96; 367/99; 367/131; 367/902
[58] Field of Search ............... 354/64, 83, 195, 25 A, 354/126, 129; 352/140, 242; 367/2, 3, 4, 87, 96, 99, 131, 902; 356/3; 181/123, 124, 402

[56] References Cited

U.S. PATENT DOCUMENTS

3,237,151  2/1966  Thorpe ..................... 181/402 X

*Primary Examiner*—William B. Perkey
*Attorney, Agent, or Firm*—Weingarten, Schurgin, Gagnebin & Hayes

[57] ABSTRACT

An underwater photographic system which includes an underwater camera enclosure having an underwater sonar range-finding apparatus for providing a signal to adjust the distance-related parameters of a camera enclosed therein. The enclosure is adapted to house typically an unaltered commercially available self-developing or "instant" camera specifically including a camera having an air-sonar range-finding device.

20 Claims, 5 Drawing Figures

UNDERWATER CAMERA ENCLOSURE INCLUDING SONAR RANGE FINDING DEVICE

FIELD OF THE INVENTION

The present photographic system relates to underwater camera enclosures, and more particularly, underwater camera enclosures having an underwater sonar range-finding means to control the enclosed camera.

BACKGROUND OF THE INVENTION

In underwater photography the requirements for the physical structure of the camera housings are substantially different for that of cameras not used under the water. Specifically, there is a requirement for the camera to be watertight and light transparent in the field of view of the camera. There are means known which enclose an otherwise non-underwater type camera for underwater use. It is typical of the known underwater camera enclosures to provide a transparent window through which the camera will photograph the desired underwater subject, as well as multiple external mechanical actuators to manipulate other controls of the camera enclosed therein. Furthermore, transparent openings in the underwater enclosures have been provided to allow self-contained flash units positioned upon the structure of the camera to illuminate the surrounding underwater area through the same enclosure containing the camera. Of particular interest are the enclosures for the recently developed self-developing cameras, wherein the film ejects from the camera upon completion of the exposure and commences developing by itself. An example of enclosures permitting underwater use of self-developing cameras are shown in U.S. Pat. Nos. 3,832,720 and 3,832,725, for use with the Polaroid Model "SX-70" self-developing instant camera. These patents are also applicable to the subsequently developed Polaroid Model "Pronto" and "660." Further advances in self-developing cameras include automatic focusing according to signals provided by an air-sonar range-finding device contained within the self-developing camera housing. These air-sonar focused cameras cannot be successfully used within the camera housings disclosed in the above-cited patents due to the great differences in acoustic propagation parameters of the media between the air-sonar transducer and the subject to be photographed. Specifically, the air-sonar signal must pass through a short distance of air, a plexiglass or other rigid and clear enclosure material, the water through a distance to the subject, and back in a reverse sequence to the air-sonar element. The typical result is for the air-sonar signal to be substantially entirely reflected within the camera's waterproof housing so as to cause the focusing mechanism of the self-developing cameras to focus at either the inner surface of the waterproofing housing or the maximal distance limit of the camera providing an improperly focused picture.

Adaptation of the underwater camera enclosure to include an acoustic window, such as described in U.S. Pat. No. 2,960,175, to permit the air-sonar transducer to communicate to the water media, will be unsuccessful due to the great difference in sound propagation velocity between the air and the water medium. The result of this difference in propagation velocity, assuming the acoustic window permits sufficient energy to traverse the boundary of the media, would be to cause the camera to focus much closer than desired for a particular underwater subject distance.

Underwater camera housings and enclosures incorporating acoustic or sonar range-finding devices are shown in U.S. Pat. Nos. 3,738,248 and 4,153,357. The enclosures disclosed therein provide a shutter signal to trigger a camera having a set predetermined focal distance. In operation, the apparatus requires the camera to be maneuvered into position with a distance to the underwater subject equal to predetermined focal length, at which time the camera is triggered and the photograph is taken. The apparatus disclosed in the above-cited patents provide no means to communicate a measured distance through the water to the subject, nor means for providing a signal proportional to that distance to the enclosed camera in a manner to adjust or affect the focusing of that enclosed camera.

Additionally, there are differences in the optical properties of the air and the water medium by which the focus of the cameras calibrated in the air media must be adjusted or offset to provide correct focusing through the water media.

SUMMARY OF THE INVENTION

The photographic system, according to the present invention, includes an underwater camera enclosure which determines the necessary camera-to-subject distance signal and communicates that signal to the distance adjustment of a camera, including a self-developing camera, enclosed within the underwater housing to control the camera focus and other distance-related adjustments. The underwater camera enclosure provides the subject distance signal according to an underwater sonar range-finding system and simulated echo computer wherein the subject distance signal provided to the camera is related to the distance through the water medium, as well as certain fixed parameters such as the shape, optical refractive index and thickness of the viewing port of the enclosure, location of the camera within the enclosure and difference in optical characteristics of air and water. The subject distance signal is thereupon communicated to the camera within the airtight underwater enclosure to thereby control the focus and other distance-related adjustments. When the camera comprises an air-sonar type camera, this subject distance signal is communicated in the form of a simulated echo which is accepted by the camera, without alteration of the camera.

Furthermore, the camera contained within the enclosure is typically of the self-developing type camera having automatic ejection of the exposed cell within the watertight enclosure, but may include other distance adjusting cameras, such as the Honeywell Visitronic, Canon CAFS (Canon Auto Focus System), Canon SST (Solid State Triangulation) and Honeywell Visitronic TCL (Through Camera Lense) which are geometric focus means. The camera also includes, within its own structure, an automatic air-sonar focus control of a type generally known and commercially available which emits a sonar pulse when triggered. The underwater enclosure includes a transponder having an air-sonar receiver which is placed a negligible distance from the air-sonar transducer on the camera. The transponder receives a transmitted signal from the enclosed camera in the form of an acoustic tone burst issued when the camera is triggered and provides a triggered-camera signal. In the transponder, the triggered-camera signal initiates an underwater range finder which has a sonar transmitter at a frequency appropriate for the water medium and is transmitted by appropriate known hydroacoustic transducers. The hydroacoustic transducer propagates the sound energy through the water media and receives the reflected underwater echo in a known manner, providing a received underwater echo signal proportional or related to the subject distance underwater. The received underwater echo signal is detected by an underwater sonar receiver also within the underwater range finder which provides an underwater-echo trigger signal. The triggered-camera signal and the underwater-echo trigger signal are received by a timing circuit in an underwater range computer which determines the underwater transit time and provides an underwater transit-time signal. The transit-time signal is then scaled by a simulated-echo computer and pulse generator, which relates the underwater transit-time signal to the triggered-camera signal and proportions the underwater transit-time signal according to the acoustical and optical difference in air and water media, as well as certain fixed parameters including the geometry and optical refractive index of the viewing port of the enclosure, the location of the camera within the nclosure and the location of the hydroacoustic transducer with respect to the enclosure, thereby creating a simulated air-echo signal which simulates a return pulse for a camera-to-subject distance in an air medium that is appropriate to cause the camera to properly control its focus and other distance-related adjustments for the in-water subject. The simulated-echo signal is transmitted by a pulse transmitter which provides the appropriate signal needed to drive an air-transducer placed appropriately to communicate with the self-developing camera's air-sonar (range-finding) transducer.

In addition to providing a simulated air-echo signal relating the underwater distance to the subject to the camera in terms of the related air transit time, the above-described system may also include compensation for the optical foreshortening due to the differences in optical characteristics of air and water.

BRIEF DESCRIPTION OF THE DRAWING

The operation and advantages of the present invention will become more clear upon reading the following detailed description of the invention in conjunction with the accompanying drawings of which.

DETAILED DESCRIPTION OF THE INVENTION

Figure 1:
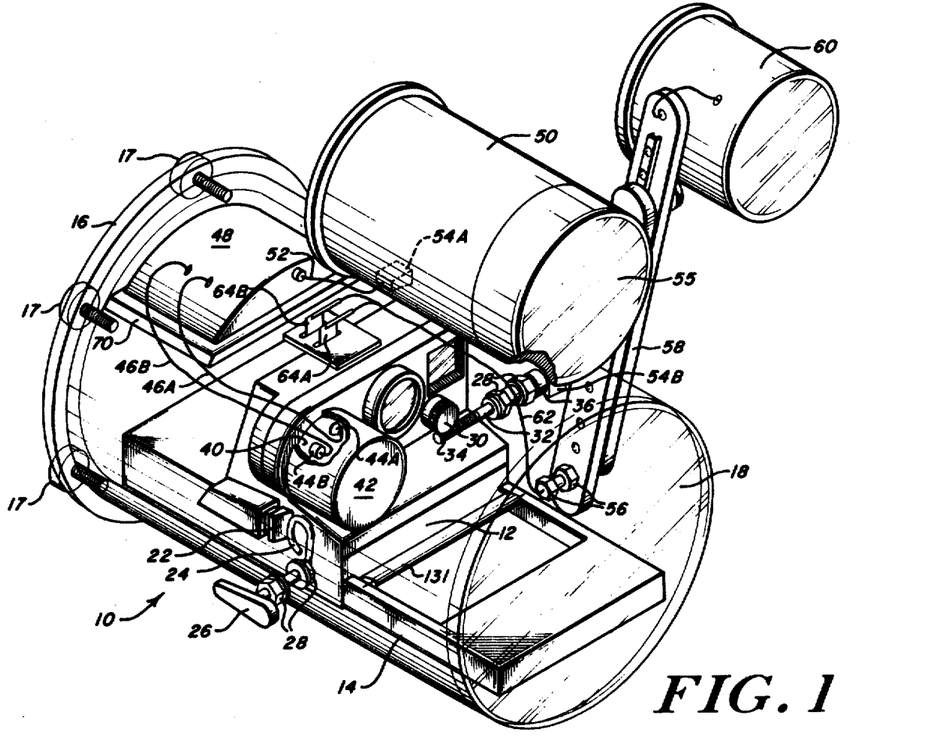
FIG. 1 is an isometric view of one embodiment of the present invention having cylindrical housing with an underwater range finder and artificial illumination source external to the housing.

Referring now to the drawing, in particular FIG. 1, the underwater photographic system including cylindrical housing 10 is shown according to one embodiment of the present invention. Housed within the enclosure 10 is a self-developing camera with air-sonar automatic focusing control 12, represented here by the Polaroid camera Model "Pronto" sonar series. The underwater enclosure 10 comprises two main sections, the front section 14 providing a housing covering substantially all of the components of the camera and the additional apparatus described hereunder, and the back plate 16 which is fixedly mounted by retaining screws 17 or other suitable closure means to the front housing 14 forming a watertight enclosure. The back plate 16 further comprises shelf elements 70 and 72 for retaining the electronics (contained in electronics compartment 48) and the camera 12, respectively. The underwater enclosure 10, comprising the elements 14 and 16, provides a watertight or first medium environment in which electrical or mechanical devices, such as a conventional and unmodified camera, may operate therein. The back plate will also provide the appropriate transparent apertures positioned as necessary to utilize the focusing, picture counter, view finder, low light level detector and other viewing ports inherent in the body and design of the camera 12. The front housing 14 will have at least one optically transparent surface 18 providing a viewing port for the camera 12; furthermore, it is desirable to provide additional surface sections of the front enclosure 14 to be transparent to allow the operator of the camera to view the exposed pictures as they are ejected from the camera 12. This may be provided by allowing the front surface 18 to be transparent over a sufficiently large area to permit the above-described viewing or the entire housing 14 to be transparent.

The underwater enclosure 10 includes various mechanical and electrical through-connections which enable the operator to operate and adjust or otherwise communicate with the enclosed camera, as well as to permit external signal connections to communicate with the camera therein. The camera trigger 22 is operated by a mechanical linkage 24 which extends in an angular manner to form a lever to urge the trigger 22 into the housing of the camera 12; the linkage 24 extends through the front housing 14 to the external trigger knob 26 when it is rotatably depressed to effect the triggering of the camera. A watertight seal is provided by the assembly 28 which comprises plastic, rubber or metalic fittings which are machined and arranged in a known manner and are commercially available. Additional mechanical adjustments may be provided by similar mechanical linkages or actuators known in the art or commercially available for camera adjustments such as the exposure trimming adjustment 30 of the camera 12. The exposure trimming adjustment 30 causes the automatic shutter control of the camera 12 to be biased in a manner to slightly over or underexpose the film according to a rotational adjustment of the control 30. The mechanical connection of this control is accomplished by another housing through-connect comprising a shaft linkage 32 having an abrasive or tooth-like tip 34 to engage the knob 30 having a knurled surface thereupon. The shaft is then actuated by an in-and-out movement or axially displaced through another watertight assembly 28. The shaft 32 has an external knob 36 by which it is operated.

The mechnical actuators may also comprise an externally mounted movable magnet controlling an internally (within the enclosure 10) mounted reed switch. The reed switch in turn causes electrical actuation of the camera 12 directly if equipped with a contact closure trigger as the Polaroid Model "SX-70," shown in FIG. 4 or of a solenoid mechanically coupled to the trigger 22 of camera 12.

The camera 12 is focused by an air-sonar range-finding system, known to the art of automatic and self-developing cameras, whereupon an acoustic signal of ultrasonic frequency or first medium acoustic pulse is propagated through the air by the air-sonar transducer 40 mounted within the enclosure of the camera 12 and received upon echo from a distant target. The distance to the subject is first calculated from the time between the transmission of the acoustic signal and the echo and then applied to the camera controls to automatically adjust the camera for focus in a first media, typically air, and exposure. The housing 14 includes, as part of its structure or additional to it, an air-water transponder including a sound absorbing cup 42 positioned to substantially entirely overlay the surface of the air-sonar transducer 40. The absorbing cup 42 includes an internal sound absorbing lining wherein the acoustic signal transmitted by air-sonar transducer 40 is sufficiently absorbed to inhibit detection of an echo (within the absorbing cup 42) by the air-sonar range-finding system. Also included in the absorbing cup 42 are two transducers 44A and 44B whereupon the acoustic signal air-sonar pulse transmitted through air by the air-sonar transducer 40 is received by transducer 44A and thereupon converted to an air-sonar transmission pulse electrical signal. The transducer 44B converts a simulated air-echo electrical-pulse signal into a simulated-echo signal to be received by air-sonar transducer 40. The transducers 44A and 44B are connected to electronics compartment 48 by leads 46A and 46B, respectively, where they communicate with an internally contained air-sonar receiver and simulated-echo transmitter, respectively. Additionally contained within electronics compartment 48 are an underwater range computer and a simulated-echo computer and generator, discussed in FIG. 5, below. The electronics contained within housing 48 communicate to an external enclosure 50 mounted on and external to the front housing 14. The external underwater sonar housing 50 includes an underwater sonar range-finding system, described below to operate in a second medium, typically water, which communicates to the internal electronics housed in electronics compartment 48 by a wire lead 52 plugged into compartment 48, provided through the mechanical support 54A which, with support 54B, affix the sonar housing 50 to the front housing 14. The underwater sonar housing 50 also comprises hydroacoustic transducer 55 through which the underwater sonar signal is generated and propagated. This hydroacoustic transducer may be formed of appropriate dimensions and acoustic material as known in the art. The dimensions and nature of the hydroacoustic trandsucer will be such to provide the desired directional characteristics of the range-finding system contained therein to permit a selective distance determination according to the direction the camera housing and thus, the sonar system, is directed.

In addition, an external flash unit or other illumination light may also be affixed to the front housing 14 as shown by mounting fitting 56. The fitting 56 retains a multi-axis adjustable arm 58 to position and retain a lamp housing 60. The arrangement and physical dimensions of the arm 58 and the lamp unit 60, as well as the fitting 56, are arranged to provide both mechanical and electrical connection to the underwater enclosure 10. The fitting 56 may also provide an electrical through-connect by which cable 62 mates with the camera receptacles 64A and 64B in the camera 12 via plugs 66A and 66B, respectively. The electronic connection and operation of external illumination sources, such as flash units, including electronic flash or flash bulb types, are generally known in the art and commercially available.

Alternatively, an electromagnetic coupler (for enclosures which contain a section of electromagnetically transparent material such as plexiglass or stainless steel), may include the primary of a transformer coil with suitable resistance and shunted by a back biased diode, is driven by the camera from receptacles 64A and 64B to send electromagnetic energy through the wall of the underwater enclosure 10. This electromagnetic energy is received by a transformer secondary coil or other electromagnetically sensitive element which effects a flow of current through the electromagnetically sensitive elements. The flow is then used to control subsequent external, electrically activated devices.

Figure 2:
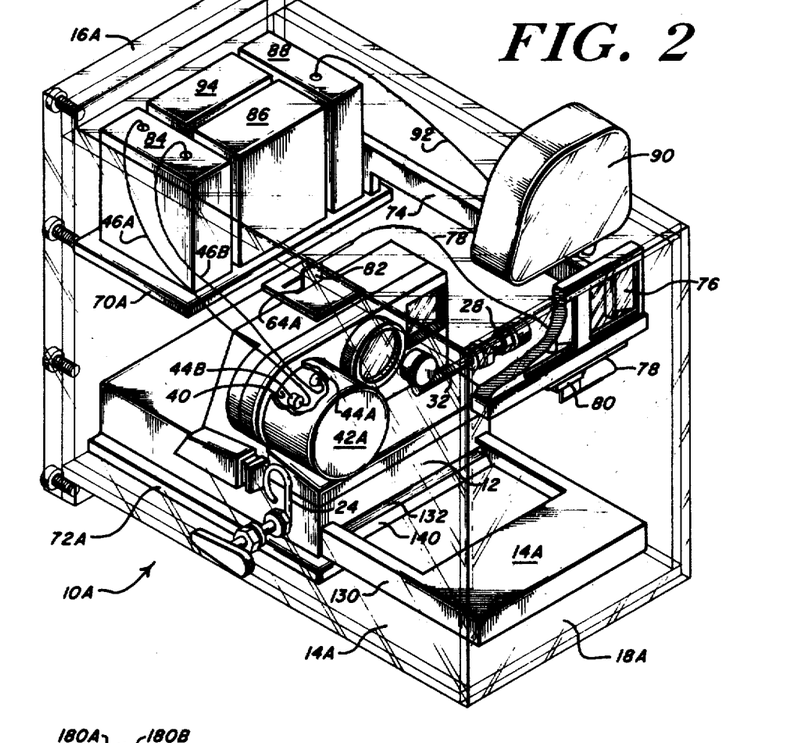
FIG. 2 is an isometric view of an alternate embodiment of the present invention having rectangular box-like housing with an artificial illumination source internal to the housing and hydroacoustic transducer of the underwater range finder external to the housing.

An alternate embodiment of the present invention is shown in FIG. 2 wherein the underwater enclosure 10A is constructed in a rectangular shape. The forward housing section 14A surrounding the camera includes an optically transparent front section 18A through which the photographs are taken. The rear plate 16A fastens to the forward housing section 14A by screws or other suitable devices forming a watertight enclosure. In this embodiment of the present invention, the rear plate 16A further comprises shelf elements 70A and 72A for retaining the electronics (contained in enclosures 48 and 50 of FIG. 1) and the camera 2, respectively. In addition, the internal shelf element 70A contains an extension arm 74 which extends forward above and out of the field of view of the camera to retain flashlamp assembly 76 which, in normal hand-held operation, resides on the top of the camera 12 at socket connection 64A. The electrical connections between the flashlamp set 76 and the socket 64A are provided by the electrical wiring harness 78 having socket 80 available to receive the flashlamp set 76, as well as plug 82 to be inserted into the socket 64A of the camera 12. The flashlamp set 76 is mounted forward within the enclosure 14A against the front section 18A to minimize internal light reflection from the flashlamp set 76 to the camera 12 from the internal surface of front section 18A. Furthermore, the mechanical linkages 24 and 32 with the associated hardware 28 are also present in this embodiment as were in the prior embodiment of FIG. 1. The backplate 16A of FIG. 2, as well as 16 of FIG. 1, also provide the appropriate transparent apertures positioned as necessary to utilize the focusing, picture counter, view finder, low light level detector, and other viewing ports inherent in the body and design of the camera 12.

A sound absorbing cup 42A resides directly in front of the camera 12 air-sonar transducer 40 by clamp means to fasten the cup 42A directly to the housing of the camera 2, or by means which affix or position the cup 42A in the forward housing section 14A so as to absorb substantially all of the transmitted energy from the air-sonar transducer 40 when the camera 12 is positioned within the enclosure 10A. Contained within the cup 42A are transducers 44A and 44B in the same manner described in reference to FIG. 1. The leads 46A and 46B connect the transducers 44A and 44B to the electronic enclosures contained and supported upon the shelf element 70A. The enclosure 84 includes the circuitry relating to the air-sonar transducer 40 of the camera 12. This includes the electronics associated with the air-sonar receiver and the simulated-echo transmitter. The electronics therein receive the (first medium) acoustic signal air-sonar pulse transmitted from the camera 12 transducer 40 after receipt by transducer 44A and condition it through use of the air-sonar receiver so as to produce a triggered-camera signal or initiate signal, which is provided both to the electronics of the underwater (second medium) sonar range-finding system, including the sonar transmitter and sonar receiver contained in enclosure 88, and to the electronics of the underwater range computer and the simulated-echo computer and generator contained in enclosure 86. The electronics within enclosure 84 also provide a simulated air-echo electrical pulse to energize the return transducer 44B so as to produce a simulated air-echo signal for receipt by the camera's air-sonar transducer 40A. The simulated air-echo electrical pulse is triggered by the electronics contained within enclosure 86 including the underwater range computer and the simulated echo computer and generator which are controlled by an underwater echo trigger signal generated within enclosure 88 in response to the received echo. The electronics within enclosure 88 through lead 92 initiate an electrical sonar output signal of appropriate frequency and duration for underwater propagation from hydroacoustic transducer 90 mounted externally on the enclosure 10A so as to communicate directly with the surrounding water medium. The frequency to be used for underwater propagation is several times greater than the air propagation frequency for a specified transducer cross-section and directional sensitivity pattern, according to the relative differences in acoustic propagation velocities in water and air, respectively. The hydroacoustic transducer 90 may also include appropriate focusing or coupling elements as necessary to provide efficient and determined behavior of the sound field in the water medium as known in the art. The lead 92, which plugs into enclosure 88, also provides a return path for the received echo signal or second medium echo signal produced by the hydroacoustic transducer 90 in response to an underwater acoustic echo which in turn produces an underwater echo-trigger signal controlling computer and timing circuits producing an underwater transit time signal within enclosure 86. The circuits of the invention are powered by self-contained batteries within the film of the camera 12 or by isolated battery sources mounted in the enclosure 94 or external to the housing 10A altogether. Further detailed descriptions of the construction and performance of the electronic systems are described below.

Figure 3:
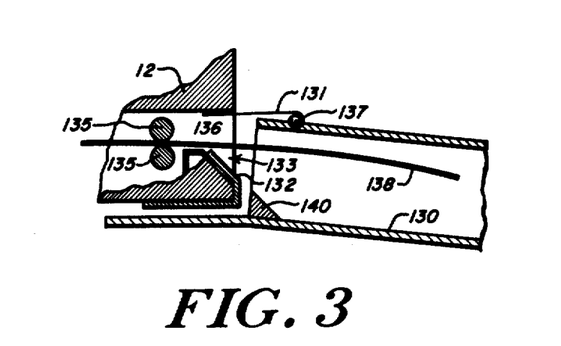
FIG. 3 is a cutaway drawing showing exposed film retaining assembly, clip and ejected film holder.

Shown in FIG. 3 is a cross-section of the camera 12 at the opening, wherein film retaining spring 136 normally retain the ejected film 138 for subsequent removal by the camera operator. The film ejected from the camera 12 through rollers 135 is freely released by the addition of a clamp 132 which engages the film ejection opening 133 of the camera 12. The film then leaves the camera and is retained by a clear transparent tray 130 which restricts the ejected film 138 from movement which would obstruct the view of the camera; furthermore, the tray 130 is transparent to allow the camera operator to inspect the prior ejected film. The tray 130 includes a shade retainer 137 in the form of a pin running through the center of the curl of the shade 131 (part of the "Pronto" camera) to partially extend the film light shade 131 so as to facilitate ejection of the film. This film light shade 131 is also shown partially extended in FIG. 1, and not shown in FIG. 2 to show the position of elements 132, 140. In FIG. 3, triangular clip retainer 140 mounted on the tray 130 urges the clip 132 into the opening 133 against the spring 136 when the tray 130 is properly seated against the camera 12.

Figure 4:
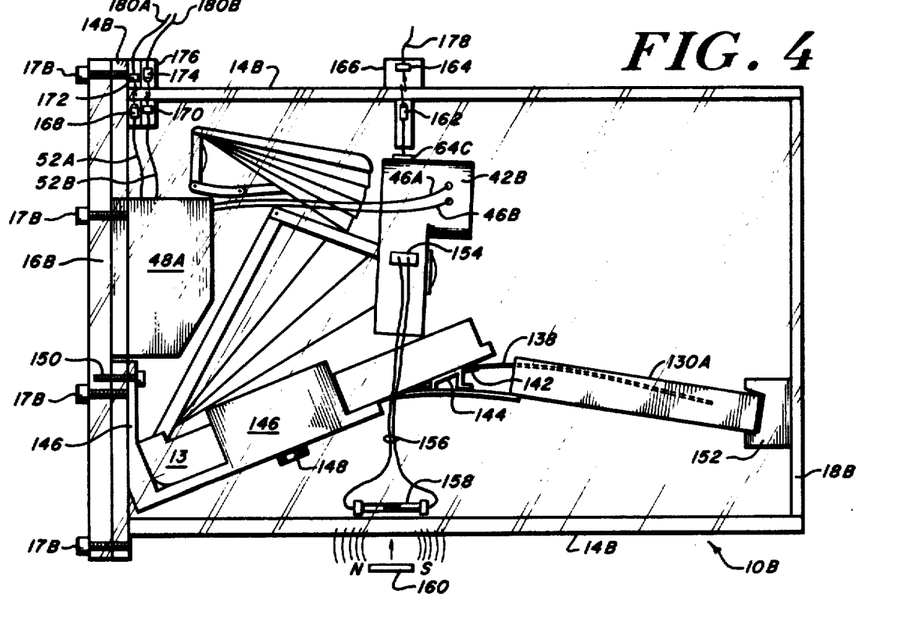
FIG. 4 is a view of one embodiment of the present invention incorporating electrooptical couplers to external illumination source, electrooptical communicator to external range finder and externally mounted magnetically-coupled camera activator.

An underwater enclosure 10B for the Polaroid Model "SX-70" sonar camera 13 is shown in FIG. 4. The front housing 14B and rear plate 16B are joined by removable screws 17B or other closure devices to provide a watertight seal. In operation, the camera 13 partially ejects exposed film 138 to be retained by the camera 13 by bottom clip 142. Clip wedge 144 inserted between the camera 13 body and the bottom clip 142 defeats the retaining action of the bottom clip, allowing exposed film 138 to be fully ejected from the camera 13 into a transparent film tray 130A supported near the transparent front 18B by support 152. The camera 13 is supported from the rear plate 16B by camera bracket 146 and retaining screw 148. The camera bracket is attached to rear plate 16B by screw 150, and also supports clip wedge 144 and transparent film tray 130A. External flash socket 64C retains a light pulse-producing element 162, which includes a light emitting diode (LED). The light pulse thereby produced by element 162 passes through the housing 14B, being at least partially transparent, and is received by photosensitive element 164 enclosed in light-proof cover 166, to control a flow of current on attached lead 178 to contact an external light source (not shown). A cover 42B encloses acoustic transducers to communicate with the camera 13 air-sonar transducer (not shown) and communicate signals along leads 46A and 46B, corresponding to the triggered camera signal and the simulated air-echo signal discussed earlier. These leads are connected to electronics compartment 48A attached to the rear plate 16B. The electronics compartment 48A includes the simulated-echo computer and generator as discussed in relation to compartment 48 shown in FIG. 1. The necessary control signals are passed through the housing 14B by electrooptical devices similar to those discussed in relation to the communication of the external light source control above. The triggered camera signal is passed by lead 52A to LED 168, which emits an optical signal through the housing 14B to a corresponding photocell 172, which controls a current on lead 180A, extending to the underwater range-finding system producing an underwater-echo trigger signal which is communicated to the camera 13. The signal is received by a LED 174 over lead 180B to produce an optical signal through the housing 14B and is received by photocell 170, which controls a current over lead 52B to electronics compartment 48A. The simulated echo computer and generator contained therein produces a simulated echo electrical-pulse signal, as discussed above, which is communicated to camera 13 over lead 46B to a transducer contained within cover 42B. Power supplies for electronics enclosed are provided by known energy sources, such as batteries, also enclosed therein. The Polaroid Model "SX-70" sonar camera is triggered by a contact closure provided by an internal reed switch 158 which is connected to external trigger connector 154 by leads 156. The normally open reed switch (nonconductive) is closed when in a magnetic field such as generated by a magnet 160, typically moved external to the housing 14B.

Figure 5:
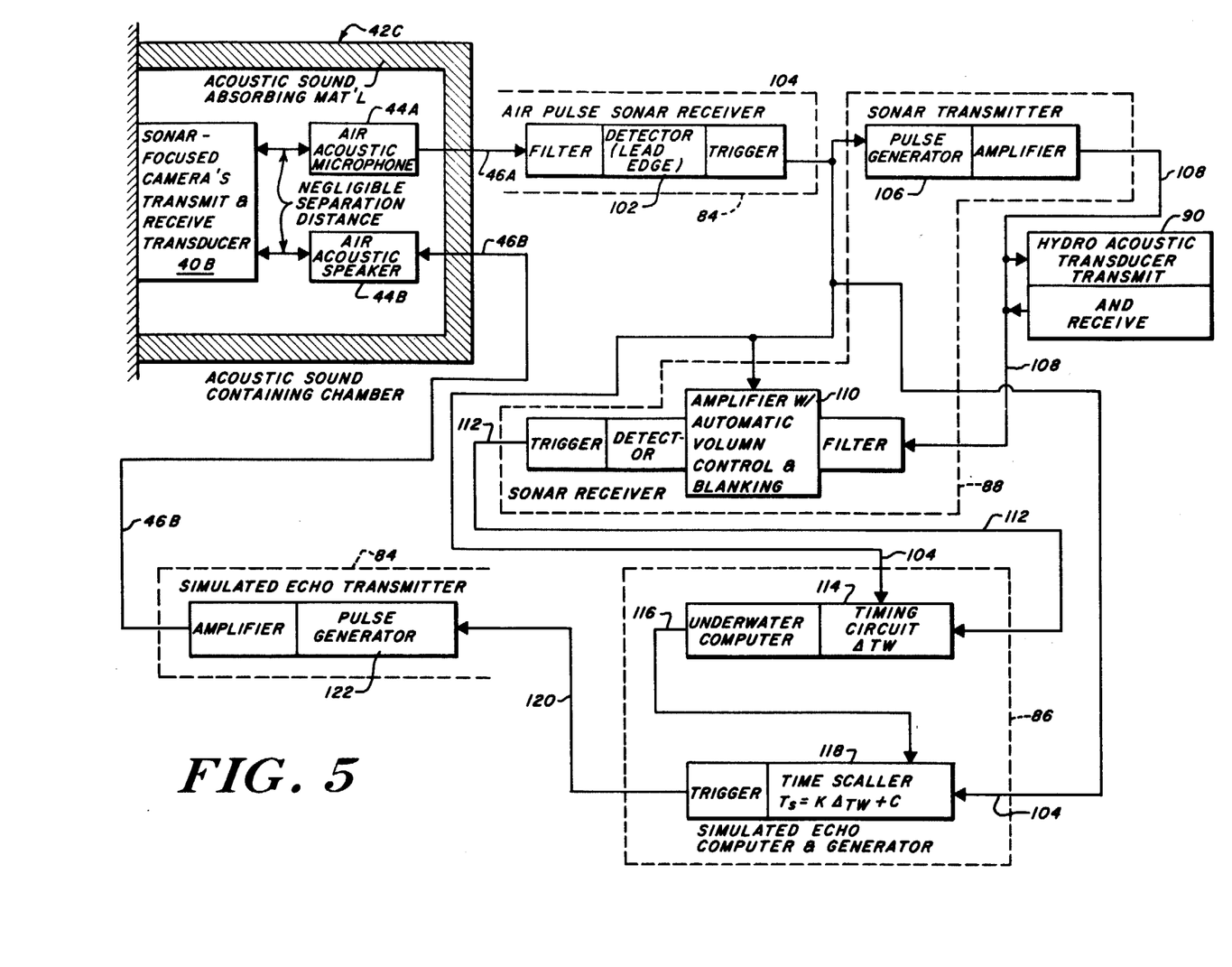
FIG. 5 is a block diagram of one embodiment of the simulated echo and underwater ranging system of the present invention.

The block diagram of FIG. 5 shows the electronic functions performed by the transponder, or underwater camera enclosure according to the present invention in relation to the instant camera 12. The cup 42 and 42A of FIGS. 1 and 2, respectively, is shown schematically in FIG. 5 as 42C wherein the transducers 44A and 44B are housed. The positioning of the transducers 44A and 44B are to be substantially in line with the camera's air-sonar transducer 40 and 40A of FIGS. 1, 2 and 4, shown here as 40B, so as to efficiently couple the energy between the elements 40 and 44A and 44B. While the spacing between the elements is not critical, it should be minimized. In addition, when electrically feasible according to known techniques allowing the same transducer to both transmit and receive, the elements 44A and 44B may be a single transducer. Alternately, transducers for a different energy propagation media, such as electrostatic and electromagnetic transducers, are useful in providing signals where signals in the primary (acoustic) media cannot be adequately received or transmitted. The transducers 44A and 44B are connected to the air-sonar receiver 102 and simulated-echo transmitter circuits 122 described below by conductive paths 46A and 46B, respectively. The transducer element 44A behaves as a microphone to receive the air-sonar acoustic signal propagated from the transducer 40B and to convert that signal to air-sonar transmission pulse electrical signal in turn received by air-sonar receiver 102. The air-sonar receiver 102 filters the signal received to eliminate spurious information, detects the leading edge of the desired signal and produces a triggered camera signal at the occurrence of that leading edge. The triggered camera signal is communicated to an underwater sonar transmitter 106 by lead 104 to control the underwater sonar transmitter 106 according to the triggered camera signal. The underwater sonar transmitter 106 provides an electrical sonar output signal along lead 108 to the hydroacoustic transducer 90 as shown and positioned in the previous FIGS. 1 and 2. The hydroacoustic transducer 90 includes the necessary acoustical transmission material to couple and propagate the underwater sonar pulse energy into the water medium and produces an underwater acoustic signal according to the electrical sonar output signal from the sonar transmitter 106. The underwater acoustic signal proceeds through the water medium to any particular acoustic discontinuity in the medium whereupon a reflected underwater acoustic signal is produced. The reflection then propagates back and is received by the hydroacoustic transducer 90 which now produces a received electrical echo signal along the same lead 108 which is now further connected to an underwater sonar receiver 110. The underwater sonar receiver 110 includes a filter circuit to remove unwanted signal components and an automatic gain control (AGC) circuit. The AGC circuit blanks or clamps the signal received during the burst of energy from the transmitter and provides a time-related gain control wherein the more distant or weaker signals (which generally occur later in time after the initial sonar pulses) are increased in amplitude over time. The underwater sonar receiver 110 further includes a signal detector circuit and a trigger circuit to produce an underwater-echo trigger signal at lead 112 upon the occurrence of the echo received by hydroacoustic transducer 90. The signals on lead 104 from the air-sonar receiver as well as the signals on lead 112 from the underwater sonar receiver are processed by the timing circuit in the underwater range computer 114 to produce an underwater transit time signal according to the (underwater transit) time between the triggered camera signal or initial signal and the underwater-echo trigger signal. The underwater transit time signal $\Delta Tw$ or second medium transit time signal appears on lead 116 which is referenced to the timing of the triggered camera on lead 104 by the simulated-echo computer and generator 118. The simulated-echo computer and generator 118 includes a time scaler which now produce a simulated air-echo electrical-pulse output signal according to the relationship of the signal $\Delta Tw$ as scaled by a constant K, plus another time offset constant C. The constant K adjusts the circuit to include the effect of differing values of acoustic propagation velocity for the water and air mediums, in particular, the fact that the acoustic propagation velocity for water is approximately five times the acoustic propagation velocity for air, and includes the effect of perceived optical differences due to the different optical characteristics of the air and water media, in particular, the foreshortening caused by the water medium, further described below. The constant C takes into account other factors such as those relating to camera location within the enclosure, the geometry and optical refractive index of the viewing port of the enclosure, and the location of the hydroacoustic transducer, with respect to the enclosure. The simulated-echo computer and generator 118 produce a trigger output along lead 120 which controls the simulated-echo transmitter 122, which includes a pulse generator and an amplifier to create a signal along lead 46B, connected to the transducer 44B. The transducer 44B produces a simulated-echo acoustic signal coupled to the sonar camera transducer 40B in a manner to emulate acoustic signals found in the automatic focusing of the self-developing camera on the subject at the appropriate distance under free air conditions. The elements and components of the electronic subsystems are generally known in the art and may be produced by those skilled in the art or otherwise obtained commercially.

In the simulated-echo computer and generator 118, the relationship formed relating the underwater transmission time (between the sonar transducer and a subject) to the air transmission time of the acoustic signal for the same distance (between the sonar transducer and the subject), is accomplished by a constant K. The constant K relates the ratio of in velocity of transmission of acoustic energy through the water medium (Vw) relative to the air medium (Va), which is approximately five; also included in the constant K is a similar ratio A relating the optical distance offset due to the different optical properties of the air and water media. For our purposes here, the optical differences cause the subject to appear at a closer distance to the camera than they actually are. For instance, when the camera is negligible distance from port, a subject at an underwater distance of four feet will properly be focused when the camera is adjused to a distance of approximately three feet with a planar viewing surface 18, 18A or 18B on the front housings, so A equals 0.75. A further compensation to provide a simulated echo is accomplished by constant C to adjust the echo response for the distance between the lens of the camera 12 and the optical viewing surface 18, 18A or 18B of the camera enclosure, and the location of the hydroacoustic transducer 90 relative to the camera enclosure. Assuming that the hydroacoustic transducer 90 is mounted on the enclosure at the same distance from the camera as is the viewing surface 18, 18A or 18B, the simulated air-echo signal Δts generally described above has the following more specific relationship between the underwater transit time Δtw and the camera-to-transducer (and viewing port) distance, Dc:

$$\Delta ts = A\ K\ \Delta tw + (2/Va)\ Dc$$

when the location of the transducer 90 and the viewing port relative to each other changes, the second (right most) term becomes more complex. Also, for more accurate translation between media, which may include different media, temperature effects, and differing optical port geometries and optical refractive indexes, the values of A, K, Va and Vw will necessarily change or become more complex.

The implemetation of the above-described relationships and the enclosure and underwater rangefinder system is intended to include known analog and digital circuitry and techniques.

The self-developing camera enclosed in the above description of the present invention is not limited to the Polaroid "Pronto," "SX-70" and "660" series, and the scope of the embodiment may be expanded to include other automatic range-finding or focusing cameras, incorporating appropriate transducer devices to communicate with the particular range-finding system of the enclosed camera. Furthermore, the above description of the present invention is made by way of example only and is not intended to limit the present invention. Other embodiments and modifications made by those skilled in the art are entirely within the scope of the present invention which is not limited accept by the following claims.

What is claimed is:

1. Photographic apparatus adapted for underwater photography with an air-sonar range-finding camera utilizing an air-sonar acoustic signal, comprising:
   a watertight enclosure retaining said camera;
   an underwater sonar range-finding means responsive to said air-sonar acoustic signal for transmitting an underwater sonar signal and for receiving an underwater sonar echo signal from an underwater subject to be photographed; and
   means resonsive to said received underwater sonar echo signal for transmitting a simulated echo signal to said air-sonar range-finding camera to produce a range signal therein corresponding to the distance between said camera and said underwater subject.

2. The apparatus of claim 1 wherein said means responsive further includes at least one of an electro-acoustic means, an electro-optic means, and an electromagnetic means to communicate said distance signal to said unmodified camera.

3. The apparatus of claim 2 said camera further comprising a trigger means and an illumination means having a trigger signal and an illumination signal, respectively.

4. The apparatus of claim 1 wherein said camera comprises a self-developing camera providing partially ejected exposed film retained in part within the body of said self-developing camera by a retaining spring assembly, said underwater enclosure further comprises a clip partially inserted into said self-developing camera to defeat said retaining assembly, thereby allowing said self-developing camera to fully eject said exposed film from the body of the self-developing camera.

5. The apparatus of claim 4 wherein said retaining assembly further includes a retractable film shade, said clip further comprises a shade retainer to inhibit the retraction of said film shade.

6. The apparatus of claim 4 further including a film holder to retain said exposed film after ejection from said self-developing camera.

7. A system enabling the underwater utilization of an apparatus having an air distance measuring device normally operable to measure a distance to a subject in air and providing an initiate signal, said system comprising:
   a watertight enclosure retaining said air distance measuring device;
   an underwater ranging means receiving said initiate signal transmitting an underwater acoustic signal and receiving an underwater echo signal from an underwater subject; and
   means responsive to said received underwater echo signal for transmitting a detected echo signal to said air distance measuring device to provide a range signal therein corresponding to the distance underwater between said apparatus and said underwater subject.

8. A system enabling the underwater utilization of an apparatus having an air distance measuring device normally operable to measure a distance to a subject in air and providing an air-sonar acoustic signal, said system comprising:
   a watertight enclosure retaining said air distance measuring device;
   an underwater ranging means receiving said air-sonar acoustic signal transmitting an underwater acoustic signal and receiving an underwater echo signal from an underwater subject; and
   means responsive to said received underwater echo signal for transmitting a simulated echo signal to said air distance measuring device to provide a range signal therein corresponding to the distance underwater between said apparatus and said underwater subject.

9. The system of claim 8 wherein said underwater ranging means comprises a sonar ranging means.

10. The system of claim 9 wherein said means responsive further includes at least one of an acoustic means, and electro-optical means, and an electromagnetic means to communicate.

11. The system of claim 10 further including at least one of a trigger means for activating said apparatus and an illumination control means for synchronizing external illumination to said apparatus.

12. The system of claim 11 wherein said trigger means includes a reed switch and a magnetic device, and said illumination control includes a light source and a photocell.

13. A transponder to operate distance controlled apparatus designed for operation in a first medium, in a second medium and to provide a distance-related signal to adjust said distance controlled apparatus according to a distance between said controlled apparatus and a selected subject in said second medium, said transponder comprising:
   a second medium range determining device including a sonar device providing a first signal relating a distance between said transponder and said selected subject;

a conversion means to relate said first signal to said distance controlled apparatus as a converted distance signal, wherein said second medium sonar device receives an initiate signal in response to said distance controlled apparatus and produces said first signal thereafter, said conversion means further comprising:

a timing circuit to measure the elapsed time between said initiate signal and said first signal to produce a second medium delay signal; and a time scaler to adjust the second medium delay signal according to a differing rate of propagation of an acoustic signal through the first medium and the propagation of an acoustic signal through said second medium producing a simulated air-echo electrical signal.

14. The transponder of claim 13 wherein said distance controlled apparatus comprises a camera having a shutter release and a distance adjustment comprising at least one of a focus control, an aperture control and a shutter-time control, said conversion means further comprising means to communicate to said camera said converted distance signal.

15. The transponder of claim 14 wherein said camera further comprises an air-sonar rangefinder producing a first medium acoustic signal and receiving a simulated air-echo signal in said first medium, said means to communicate further comprising an air-sonar receiver to receive said first medium acoustic signal to form said initiate signal; and a simulated echo transmitter to transmit said simulated air-echo signal formed in response to said simulated air-echo electrical signal.

16. The transponder of claim 15 wherein said time scaler further relates the differences in optical refractive index in the first medium and the second medium, wherein said first medium reflected signal is adjusted to properly focus for distance for said selected subject.

17. The transponder of claim 16 wherein said time scaler further adjusts the second medium delay signal according to at least one of the fixed parameters of an optical viewing port including the shape, thickness, and optical refractive index, and distance between said means to communicate and said camera.

18. The transponder of claim 17 wherein said air-sonar transmitter and said air sonar receiver includes a common transducer.

19. The transponder of claim 18 wherein said first medium is air and said second medium is water.

20. The transponder of claim 19 wherein said second medium sonar device futher includes:

a sonar transmitter responsive to said initiate signal to produce an electrical sonar output signal;

a hydroacoustic transducer responsive to said electrical sonar output signal producing an underwater acoustic signal and receiving a reflected underwater acoustic signal producing a received electrical echo signal; and a sonar receiver responsive to said received electrical echo signal to produce said underwater echo trigger signal, said hydroacoustic receiver including a signal filter, an automatic gain control circuit and a pulse detector circuit.

* * * * *